United States Patent [19]

Lin et al.

[11] Patent Number: 5,374,336
[45] Date of Patent: * Dec. 20, 1994

[54] WATER SOLUBLE GRAFT COPOLYMERS AND METHODS OF USE THEREOF

[75] Inventors: John T. Lin, Jacksonville, Fla.; Wen P. Liao, Warminster; Fu Chen, Newtown, both of Pa.

[73] Assignee: Betz Laboratories, Inc., Trevose, Pa.

[*] Notice: The portion of the term of this patent subsequent to May 18, 2010 has been disclaimed.

[21] Appl. No.: 101,139

[22] Filed: Aug. 3, 1993

Related U.S. Application Data

[60] Continuation-in-part of Ser. No. 773, Jan. 5, 1993, Pat. No. 5,298,566, which is a division of Ser. No. 691,206, Apr. 25, 1991, Pat. No. 5,211,854.

[51] Int. Cl.$^5$ .................. D21H 21/10; C02F 1/56; C08F 265/10
[52] U.S. Cl. .................. 162/168.3; 525/269; 525/285; 525/291; 525/293; 525/296; 525/301; 525/303; 525/308; 210/734; 162/168.2
[58] Field of Search .............. 210/734; 525/260, 263, 525/269, 285, 291, 293, 296, 301, 303, 308; 162/168.3

[56] References Cited

U.S. PATENT DOCUMENTS

| | | | |
|---|---|---|---|
| 3,284,393 | 11/1966 | Vanderoff et al. | 526/207 |
| 3,711,573 | 1/1973 | Nagg | 210/734 |
| 3,869,418 | 3/1975 | Peterson et al. | 260/29.7 |
| 3,899,471 | 8/1975 | Lorenz et al. | 210/734 |
| 3,951,791 | 4/1976 | Huang et al. | 210/734 |
| 3,993,712 | 11/1976 | Guilbault | 210/734 |
| 4,152,507 | 5/1979 | Shibahara et al. | 210/734 |
| 4,191,645 | 3/1980 | Begula, Jr. et al. | 210/734 |
| 4,271,053 | 6/1981 | Kelsey et al. | 260/29.2 EP |
| 4,400,496 | 8/1983 | Butler et al. | 527/312 |
| 4,599,390 | 7/1986 | Fan et al. | 210/734 |
| 4,835,206 | 5/1989 | Furrar et al. | 525/296 |
| 4,835,234 | 5/1989 | Valint et al. | 525/258 |
| 4,916,191 | 4/1990 | Takeuchi et al. | 526/276 |
| 4,954,220 | 9/1990 | Rushmere | 162/168.3 |
| 5,108,622 | 4/1992 | Liao et al. | 210/734 |
| 5,185,206 | 2/1993 | Rushmere | 428/403 |
| 5,194,120 | 3/1993 | Peats et al. | 162/168.3 |
| 5,211,854 | 5/1993 | Liwo et al. | 210/734 |
| 5,286,827 | 2/1994 | Ahmed | 526/287 |

FOREIGN PATENT DOCUMENTS 0356241 2/1990 European Pat. Off.

OTHER PUBLICATIONS

"Hawley's Condensed Chemical Dictionary", 11th ed., New York, Van Nostrand Reinhold, 1987, p. 224.
Smirnova et al., Journal of Polymer Science, vol. 29, pp. 139–145, 1991, "Complexing Effect in the Reaction of Graft Polymerization Proceedings by the Coordination-Radical Mechanism with the Participation of Copper Ions".

*Primary Examiner*—Vasu S. Jagannathan
*Attorney, Agent, or Firm*—Alexander D. Ricci; Gregory M. Hill

[57] ABSTRACT

A water soluble graft copolymer useful as retention and drainage aids in papermaking processes having the structure:

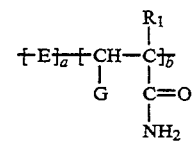

wherein E is the repeat unit obtained after polymerization of an $\alpha,\beta$ ethylenically unsaturated compound, the molar percentage of a:b is from about 95:5 to 5:95, with the proviso that the sum of a and b equals 100%; G comprises the structure:

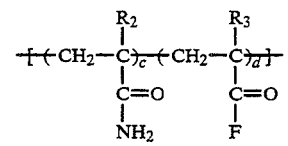

wherein d is a cationic monomer, $R_1$, $R_2$ and $R_3$ are the same or different and are hydrogen or a lower alkyl group having $C_1$ to $C_3$, F is the salt of an ammonium cation and the molar percentage of c:d is from 95:5 to 5:95 with the proviso that the sum of c and d equals 100%.

13 Claims, No Drawings

WATER SOLUBLE GRAFT COPOLYMERS AND METHODS OF USE THEREOF

This is a continuation-in-part of application Ser. No. 8/000,773 filed Jan. 5, 1993, now U.S. Pat. No. 5,298,566 which is a divisional of application Ser. No. 07/691,206 filed Apr. 25, 1991 now U.S. Pat. No. 5,211,854.

FIELD OF THE INVENTION

The present invention pertains to novel water soluble graft copolymers which are useful for water treatment, such as sludge dewatering and water clarification. In addition they are also effective as retention and drainage aids in the paper making process.

BACKGROUND OF THE INVENTION

There is an increasing usage of water soluble polymers and copolymers in wastewater treatment industries. These compounds have shown desirable utility for the purpose of dewatering sludge and clarifying contaminated water.

The efficacies of the polymers or copolymers used will vary depending upon the type of monomers chosen to form the polymer or copolymer, the molecular weight of the synthesized molecule and, in the case of a copolymer, the placement of the selected monomers on the backbone of the copolymer. It is the latter characteristic that is the focus of the present invention.

Polymers with long sequences of two monomers can be categorized as block copolymers or graft copolymers. In graft copolymers sequences of one monomer are "grafted" onto a "backbone" of the second monomer type,

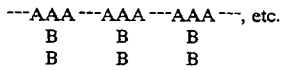

Graft copolymers have unique and highly desirable properties as compared to random copolymers or the blend of two homopolymers. Therefore, there is a great interest in preparing them. Few techniques described in the literature satisfy the need.

Furthermore, with ever increasing usages of water soluble polymers and copolymers in industries such as wastewater treatment, cooling, boiler and deposit control, coating, textile, mining, detergency, cosmetics, and papermaking, etc., there is an urgent need to synthesize novel water soluble graft copolymers for this broad range of applications.

It is a further object of this invention to prepare distinctive water soluble graft copolymers for water treatment applications and specifically for papermaking processes.

U.S. Pat. No. 3,869,418 describes a graft copolymer comprising a polymeric N-vinyl lactam such as N-vinyl pyrrolidone with unsaturated carboxylic acids, like acrylic acid and methacrylic acid in an emulsion process. The resulting copolymer is not water soluble and is used for adhesive and coating applications.

U.S. Pat. No. 4,271,053 discloses quaternary ammonium graft copolymers prepared by grafting quaternary ammonium ionene-type polymeric side chains onto a polymer backbone formed by the reaction of a difunctional amine and an epihalohydrin or diperoxide. The polymers are different than the present invention.

U.S. Pat. No. 4,400,496 and European Patent Application 0 356 241 teach grafting acrylamide or acrylic acid with starch in the presence of ceric ions. The product has to be precipitated and separated in acetone prior to use.

Smirnova et. al., Journal of Polymer Science, Vol. 29, pp. 139–145 describe a graft copolymerization of methacrylic acid with polycaproamide by the persulfate/sulfite redox system in the presence of copper ions. It is a different reaction mechanism and results in a different copolymer than the present invention.

U.S. Pat. No. 4,916,191 discloses a graft copolymer prepared from a macromonomer with hydrophilic and fluorinated monomers for dispersion stabilizer in an emulsion polymerization process.

Compared to the related art disclosed above, there exists a need to prepare water soluble graft copolymers in a convenient and economic process. This objective is achieved by the present invention. The resulting copolymers exhibit desired efficacy as paper retention and drainage aids.

DETAILED DESCRIPTION OF THE INVENTION

The present invention pertains to novel water soluble graft copolymers which are useful as retention and drainage aids in paper/pulp making processes.

Specifically, the graft polymers in the invention contain polymeric segments obtained from the polymerization of acrylamide and cationic monomers which are attached or "grafted" to another polymer chain which is comprised of the repeating units of one or more monomers. The resulting graft copolymers are soluble in an aqueous medium.

The graft copolymer of the invention has the general structure:

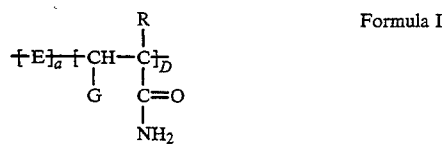

Formula I

Wherein E in the above formula (Formula I) is the repeat unit obtained after polymerization of an $\alpha,\beta$ ethylenically unsaturated compound, preferably carboxylic acid, amide form thereof, alkyl (C1–C8) ester or hydroxylated alkyl (C1–C8) ester of such carboxylic acid. Compounds encompassed by E include the repeat unit obtained after polymerization of acrylamide, methacrylamide, acrylic acid, methacrylic acid, maleic acid or anhydride, styrene sulfonic acid, 2-acrylamido-2-methylpropyl sulfonic acid, itaconic acid, and the like. Ester derivatives of the above mentioned acids such as 2-hydroxypropyl acrylate, methyl methacrylate, and 2-ethylhexyl acrylate, are also within the purview of the invention.

The molar percentage of a:b is from about 95:5 to 5:95, with the proviso that the sum of a and b equals 100%.

G in the above formula (Formula I) is a polymeric segment comprising repeat units having the structure:

Formula II

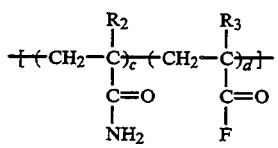

wherein $R_1$, $R_2$ and $R_3$ in Formulae I and II are the same or different and are hydrogen or a lower alkyl group having $C_1$ to $C_3$. F in the above formula is a salt of an ammonium cation, such as $NHR_3N^+R_{(4,5,6)}$ $M^-$ or $OR_3N^+R_{(4,5,6)}$ $M^-$, wherein $R_3$ is a $C_1$ to $C_4$ linear or branched alkylene group, and $R_4$, $R_5$ and $R_6$ can be selected from the group consisting of hydrogen, $C_1$ to $C_4$ linear or branched alkyl, $C_5$ to $C_8$ cycloalkyl, aromatic or alkyl aromatic group; and M is an anion, such as chloride, bromide, or methyl or hydrogen sulfate. Typical cationic monomers are 2-acryloyloxyethyltrimethylammonium chloride (AETAC), 3-(meth)acrylamidopropyltrimethylammonium chloride (MAPTAC or APTAC), 2-methacryloyloxyethyltrimethylammonium chloride (METAC) and diallyldimethylammonium chloride (DADMAC), etc.

It is understood that more than one kind of cationic monomer may be present in Formula II.

The molar percentage c:d in Formula II may vary from 95:5 to 5:95, with the proviso, however, the sum of c and d equals 100%.

There is no limit to the kind and mole percent of the monomers chosen so long as the total adds up to 100 mole % and the resulting copolymers are water soluble.

At present, the preferred water soluble graft copolymer for use as retention and drainage aids is:

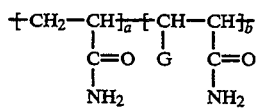 Formula III

The molar percentage of a:b is from about 95:5 to 5:95, with the proviso that the sum of a and b equals 100%. G in Formula III is:

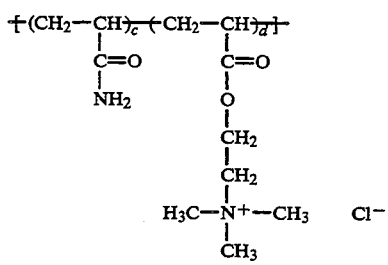 Formula IV

The cationic monomer is 2-acryloyloxyethyltrimethylammonium chloride (AETAC). The molar percentage c:d in the polymer segment G (Formula IV) is the ratio of Acrylamide:AETAC. It may fall within the range between 95:5 and 5:95. The sum of c and d must add up to 100%.

The number average molecular weight ($M_n$) of the polymeric segment G is not critical and may fall within the range of 1,000 to 1,000,000. Preferably, the number average molecular weight will be within the range of 5,000 to 500,000, with the range of about 10,000 to about 200,000 being even more desirable. The key criterion is that the resulting graft copolymer be water soluble.

The graft copolymer is prepared via a two-step polymerization process. First, a macromonomer comprised of acrylamide and AETAC is prepared by a water-in-oil inverse emulsion polymerization method using peroxide as an initiator. Such processes have been disclosed in U.S. Pat. Nos. 3,284,393, Reissue 28,474 and Reissue 28,576, herein incorporated by reference. The initiator may be selected from peroxides, persulfates, bromates, and azo-type initiators such as 2,2'azobis-(2-amidinopropane) dihydrochloride, 2,2'-azobis-(2,4-dimethylvaleronitrile). Copper (II) sulfate is added in the process as an oxidative chain transfer agent to generate a terminal unsaturated double bond in the polymer chain. It is conceivable that transition metal ions other than copper, such as iron, cobalt, and nickel etc., may be used in the invention.

Ethylenediaminetetraacetic acid or diethylenetriamine pentaacetic acid and their salts or their amino analogue are used as chelating agents to chelate or to form complexes with copper prior to the second polymerization step.

The resulting macromonomer is then copolymerized with acryl amide or other monomers to form graft copolymers by a similar water-in-oil inverse emulsion technique.

Branching agents such as polyethyleneglycol di(meth)acrylate, N,N'-methylenebis(meth)acrylamide, N-vinyl acrylamide, allyl glycidyl ether, glycidyl acrylate and the like may also be added, providing the resulting graft copolymer is water soluble. Any of the well known chain transfer agents familiar to those who skilled in the art may be used to control the molecular weight. Those include, but are not limited to, lower alkyl alcohols such as isopropanol, amines, mercaptans, phosphites, thioacids, formate, allyl alcohol and the like.

Conventional initiators such as peroxide, persulfate, along with sulfite/bisulfite and azo compounds may be used depend on the system chosen.

High HLB inverting surfactants such as those described in U.S. Pat. No. Re. 28,474 are then added to the emulsion to convert the resulting emulsion to a "self-inverting" emulsion. Using the procedure described herein, a unique graft copolymer in emulsion form is obtained.

The resulting copolymer may also be further isolated by precipitating it in an organic solvent such as acetone and dried to a powder form. The powder can be easily dissolved in an aqueous medium for use in the desired applications.

It is to be understood that the aforementioned polymerization methods do not in any way limit the synthesis of copolymers according to this invention.

The resulting emulsion disperses and dissolves rapidly into an aqueous solution upon addition to water. Within minutes, a maximum solution viscosity is obtained. The emulsion dissolves well even in water containing a high level of hardness and it also retains most of its solution viscosity in brine water.

The structure of the graft copolymer is substantiated by a conventional solution viscosity study and $C^{13}$ NMR spectros copy. The molecular weight of the resulting graft copolymer is not critical, as long as the polymer is soluble in water. The molecular weight may vary over a wide range, e.g., 10,000–30,000,000 and may be selected depending upon the desired application.

The graft copolymer is added to the pulp furnish prior to the paper forming stages. It is added in an amount of from about 0.5 to 25 pounds per ton of furnish. Preferably about 1.0 to 10 pounds of copolymer per ton of furnish is used.

EXAMPLES

Utilizing the procedure described above, numerous water soluble graft copolymers were prepared. Table I hereinbelow summarizes the physical properties of the resulting acrylamide/AETAC graft copolymers.

TABLE I

| Physical Properties of the Graft Copolymers | | | |
| --- | --- | --- | --- |
| Example | AETAC Content mole % | Solids % | UL Viscosity (cps) |
| J-2 | 5 | 34.4 | 11.6 |
| J-10 | 5 | 34.9 | 21.0 |
| J-14 | 5 | 35.1 | 12.6 |
| J-19 | 5 | 31.3 | 13.0 |
| J-21 | 5 | 31.9 | 14.1 |
| J-28 | 5 | 32.0 | 11.0 |
| J-30 | 10 | 33.2 | 12.7 |
| J-31 | 10 | 35.0 | 11.6 |
| J-23 | 10 | 34.7 | 4.5 |
| J-25 | 10 | 34.5 | 19.3 |
| J-07 | 10 | 37.9 | 16.1 |
| J-20 | 10 | 34.3 | 12.6 |

Performance Evaluation

Papermaking retention aids are used to increase the retention of fiber and filler fine furnish solids in the web during the turbulent process of draining and forming the paper web. The extensive use of retention aids is well documented in the paper industry. For example, see "Retention Chemistry", Chapter 17, Pulp and Paper, James P. Casey, Volume 3, 3rd edition, pages 1593 to 1607. Without adequate retention of the fine solids, they are either lost to the process effluent, which is a cost consideration for expensive fillers, or accumulate to excessively high concentrations in the recirculating white water loop and cause production difficulties including deposit buildup and impaired paper machine drainage.

Additionally, insufficient retention of the fine solids and the disproportionate quantity of chemical additives which are absorbed on the surface reduces the papermaker's ability to achieve necessary paper quality specifications such as opacity, strength, sizing, basis weight, and formation (sheet uniformity).

In the following tests, the performance of the resulting water soluble graft copolymers as retention and drainage aids in the paper making process is demonstrated. The standard Britt jar test as well as tests using a pulp drainage testing device were used for evaluation.

Laboratory prepared acid and alkaline furnishes were used as the substrates. Hardwood and softwood market pulp were refined separately to respective 300 and 500 Canadian Standard Freeness, and mixed at a 50/50 ratio. Alkaline furnish was prepared with the addition of precipitated calcium carbonate at a level of 20% of the total furnish solids. The resulting pH was 8.5. Acid furnish was prepared with the addition of rosin size at 10 lbs/ton and alum at 15 lbs/ton based upon fiber solids. 20% clay and 5% $TiO_2$ based upon fiber solids was then added, and the pH was adjusted to 4.5.

Fines retention tests were conducted on the Britt jar with thin stock at 0.5% consistency. Polymers at the specified dosage were added to stock in the Britt jar at 1400 rpm shear speed and allowed to mix for 15 seconds. 100 mls of filtrate was collected and filtered to determine the fines content per standard procedure. Polymers were tested at 1.5, 2.25, 3.0 and 3.75 lbs/ton based upon furnish solids, and compared to blank samples. Drainage tests were conducted with the CSF tester. Thin stock was prepared at 0.30% consistency. Polymers were added to the stock at 1400 rpm and mixed for 15 seconds before testing on the CSF. Polymers were tested at 1.5, 2.25, and 3.0 lbs/ton, and compared to blank tests.

The results are shown in Tables 2 and 3.

TABLE 2

| Alkaline Furnish Retention (%) | | | | |
| --- | --- | --- | --- | --- |
| | Polymer Dosage in Pounds (lbs) Polymer per ton (T) of Furnish | | | |
| Example | 1.5 lbs/T | 2.25 lbs/T | 3.0 lbs/T | 3.75 lbs/T |
| J-2 | 55.2 | 60.0 | 65.0 | 66.2 |
| J-10 | 61.6 | 71.1 | 76.5 | 80.6 |
| J-30 | 54.5 | 66.1 | 70.6 | 74.0 |
| J-31 | 55.3 | 56.5 | 63.6 | 68.7 |
| J-23 | 40.4 | 46.4 | 50.0 | 46.0 |
| J-25 | 50.7 | 59.8 | 62.0 | 65.3 |
| J-07 | 40.1 | 46.7 | 56.0 | 59.5 |
| J-20 | 52.3 | 61.3 | 66.4 | 70.0 |
| Blank 16.3% | | | | |

TABLE 3

| Acid Furnish Retention (%) | | | | |
| --- | --- | --- | --- | --- |
| | Polymer Dosage in Pounds (lbs) Polymer per ton (T) of Furnish | | | |
| Example | 1.5 lbs/T | 2.25 lbs/T | 3.0 lbs/T | 3.75 lbs/T |
| J-2 | 36.9 | 44.3 | 58.9 | 72.4 |
| J-10 | 40.4 | 51.8 | 61.8 | 74.6 |
| J-30 | 38.6 | 47.7 | 61.1 | 68.2 |
| J-31 | 41.3 | 52.9 | 62.8 | 74.3 |
| J-23 | 39.6 | 42.1 | 50.6 | 50.9 |
| J-25 | 39.1 | 45.3 | 59.3 | 65.9 |
| J-07 | 36.6 | 42.1 | 46.6 | 56.1 |
| J-20 | 39.8 | 51.8 | 60.0 | 67.5 |
| Blank 18.5% | | | | |

A drainage testing device equipping with a rotating hydrofoil (300 rpm), and vacuum capability underneath the wire screen (100 mesh) was also used to evaluate the graft copolymers of the invention. The device can be operated for multi-pass of substrate and reach an equilibrium stage. It is a closer simulation of the actual paper making process than the conventional Britt jar and CSF tests. Both the retention and drainage behavior of the tested paper pulp and treatment can be easily characterized. The testing conditions are:

A) Foil=300 rpm (equivalent to a 1500 ft/min machine); Mixer=1400 rpm; Wire screen=100 mesh. Vacuum dewatering starts when the white water drainage (by gravity/pulsation forces) reaches 80% of the initial furnish volume. Couch vacuum=14 inch-Hg.

B) Furnish: Headbox stock form Hawesville: % Fiber fines=40.69, CSF=350.

C) Multi-pass test and white water recirculation: For the first-pass, the stock (178 cc, %con=0.56) was diluted with process water to 1000 cc before test. For the subsequent passes, the stock was diluted with the white water generated from the previous pass. (only about 82% of the white water can be recovered in this process.) A total of six passes were conducted for each tested system. The results are shown in Table 4.

TABLE 4

| Treat-ment | 1st-Pass | | | | 6th Pass % FR | Equilibrium | | |
|---|---|---|---|---|---|---|---|---|
| | % FR | pgDR | vDR | RES | | pgDR | vDR | RES |
| J-14 | 49.5 | 15.8 | 1.09 | 0.12 | 49.7 | 34.4 | 2.57 | 0.27 |
| J-19 | 60.9 | 16.4 | — | — | 51.3 | 30.2 | — | — |
| J-21 | 56.8 | 15.6 | — | — | 52.4 | 28.5 | — | — |
| J-28 | 51.4 | 14.6 | 0.94 | 0.11 | 43.7 | 28.9 | 2.13 | 0.23 |
| J-10 | 51.5 | 14.0 | 0.88 | 0.11 | 54.1 | 34.1 | 2.65 | 0.27 |
| J-2 | 53.5 | 15.5 | 0.99 | 0.11 | 46.6 | 29.7 | 2.09 | 0.24 |
| J-07 | 42.1 | 12.7 | 0.93 | 0.10 | 38.0 | 25.9 | 2.05 | 0.23 |
| J-20 | 52.3 | 14.9 | 0.77 | 0.10 | 46.7 | 24.8 | 1.97 | 0.23 |
| J-23 | 49.2 | 14.0 | 0.82 | 0.11 | 40.1 | 28.9 | 2.10 | 0.24 |
| J-25 | 48.8 | 14.5 | 0.93 | 0.11 | 46.2 | 34.1 | 2.51 | 0.27 |
| J-30 | 42.7 | 12.0 | 0.99 | 0.11 | 50.7 | 25.7 | 2.56 | 0.28 |
| J-31 | 48.2 | 13.3 | 0.88 | 0.11 | 48.3 | 26.0 | 2.07 | 0.23 |
| A | 57.7 | 14.8 | — | — | 51.4 | 30.1 | — | — |
| blank | 49.5 | 16.5 | 0.99 | 0.13 | 44.0 | 32.2 | 2.61 | 0.30 |

% FR = the percentage of fines retained in the sheet
PgDR = pulsation/gravity drainage time (sec). The smaller the pgDR is, the better; a 5% difference is significant.
vDR = vacuum drainage time (sec). The smaller the vDR is, the better.
RES = air flow resistance of the wet pad, a measure of formation. The greater the RES is, the better.
A = a commercial acrylamide/AETAC copolymer with a linear configuration.

The above data show that graft copolymer made in accordance with this invention are effective for retention and drainage aids in paper making processes.

While this invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

We claim:

1. A method of improving the retention and drainage characteristics of a papermaking process comprising adding to the pulp furnish from about 0.5 to 25 pounds per ton of the pulp furnish of a water soluble graft copolymer having the structure:

$$\mathrm{+E\!\!+\!\!_{a}\!\!+\!\!CH\!\!-\!\!C\!\!+\!\!_{b}}$$
$$\begin{array}{cc} | & | \\ G & C\!\!=\!\!O \\ & | \\ & NH_2 \end{array}$$

wherein E is the repeat unit obtained after polymerization of an $\alpha,\beta$ ethylenically unsaturated compound, the molar percentage of a:b is from about 95:5 to 5:95, with the proviso that the sum of a and b equals 100%; G comprises the structure:

$$\mathrm{+\!\!+\!\!CH_2\!\!-\!\!C\!\!+\!\!_{c}\!\!+\!\!CH_2\!\!-\!\!C\!\!+\!\!_{d}\!\!+\!\!}$$
$$\begin{array}{cc} R_2 & R_3 \\ | & | \\ C\!\!=\!\!O & C\!\!=\!\!O \\ | & | \\ NH_2 & F \end{array}$$

wherein, d is a cationic monomer $R_1$, $R_2$ and $R_3$ are the same or different and are hydrogen or a lower alkyl group having $C_1$ to $C_3$, F is the salt of an ammonium cation and the molar percentage of c:d is from 95:5 to 5:95 with the proviso that the sum of c and d equals 100%.

2. The copolymer of claim 1 wherein the $\alpha,\beta$ ethylenically unsaturated compound is selected from the group consisting of a carboxylic acid, the amide form thereof, the alkyl ($C_1$-$C_8$) ester thereof, and the hydroxylated alkyl ($C_1$-$C_8$) ester thereof "maleic anhydride, styrene sulfonic acid and 2-acrylamido-2-methyl propyl sulfonic acid,".

3. The copolymer of claim 2 wherein the $\alpha,\beta$ ethylenically unsaturated compound is selected from the group consisting of acrylamide, methacrylamide, acrylic acid, methacrylic acid, maleic acid, itaconic acid, 2-hydroxylpropyl acrylate, methyl methacrylate and 2-ethylhexyl acrylate.

4. The copolymer of claim 1 wherein F is selected from the group consisting of $NHR_3N^+(R_4,R_5,R_6)M^-$ and $OR_3 N^+(R_4,R_5,R_6)M^-$, wherein $R_3$ is a $C_1$ to $C_4$ linear or branched alkylene group, $R_4,R_5$, and $R_6$ are selected from the group consisting of hydrogen, $C_1$ to $C_4$ linear or branched alkyl, $C_5$ to $C_8$ cycloalkyl, aromatic or alkylaromatic group, and $M^-$ is an anion selected from the group consisting of chloride, bromide, methyl sulfate and hydrogen sulfate.

5. The copolymer of claim 1 wherein the cationic monomer is selected from the group consisting of 2-acryloyloxyethyltrimethylammonium chloride, 3-methacrylamidopropyltrimethyl ammonium chloride, 2-methacryloyloxyethyltrimethylammonium chloride and diallyldimethylammonium chloride.

6. The method of claim 1 having the structure:

$$\mathrm{+CH_2\!\!-\!\!CH\!\!+\!\!_{a}\!\!+\!\!CH\!\!-\!\!CH\!\!+\!\!_{b}}$$
$$\begin{array}{ccc} | & & | \\ C\!\!=\!\!O & G & C\!\!=\!\!O \\ | & & | \\ NH_2 & & NH_2 \end{array}$$

Wherein the molar percentage a:b is from about 95:5 to 5:95, with the proviso that the sum of a and b equals 100%, and G has the $$\mathrm{+\!\!(CH_2\!\!-\!\!CH)\!\!_{c}\!\!+\!\!CH_2\!\!-\!\!CH\!\!)_{d}\!\!+\!\!}$$
$$\begin{array}{cc} | & | \\ C\!\!=\!\!O & C\!\!=\!\!O \\ | & | \\ NH_2 & O \\ & | \\ & CH_2 \\ & | \\ & CH_2 \\ & | \\ & H_3C\!\!-\!\!N^+\!\!-\!\!CH_3 \quad Cl^- \\ & | \\ & CH_3 \end{array}$$

7. The method of claim 1 wherein the number average molecular weight of G is from about 1,000 to about 1,000,000.

8. The method of claim 7 wherein the number average molecular weight of G is from about 5,000 to about 500,000.

9. The method of claim 8 wherein the number average molecular weight of G is from about 10,000 to about 200,000.

10. The method of claim 1 wherein the graft copolymer has a number average molecular weight of from about 10,000 to 30,000,000.

11. The method of claim 10 wherein the graft copolymer has a number average molecular weight of from about 1,000,000 to 30,000,000.

12. The method of claim 1 wherein the amount is from about 1.0 to 10 pounds per ton of pulp furnish.

13. The method of claim 1 wherein the graft copolymer is added to the pulp furnish prior to the paper forming stages.

* * * * *